V. A. FYNN.
DYNAMO ELECTRIC MACHINE.
APPLICATION FILED MAR. 16, 1914.
1,183,000.
Patented May 16, 1916.
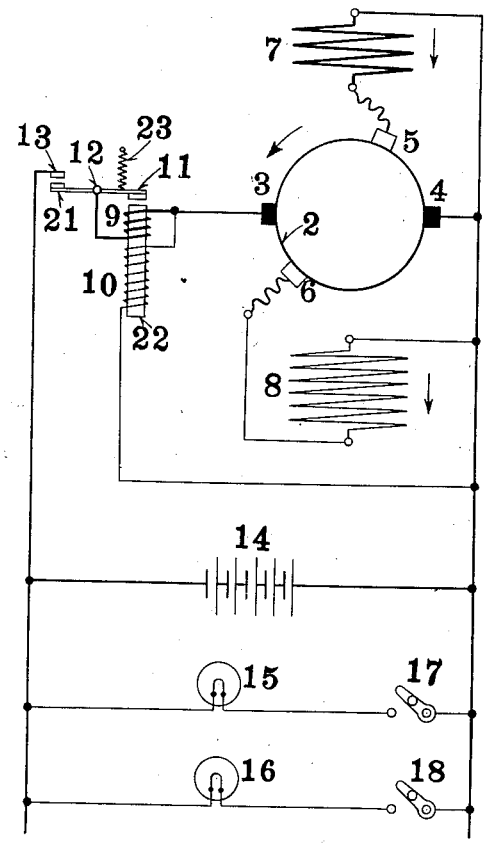
WITNESSES:
INVENTOR
V. A. Fynn.
BY
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,183,000.  Specification of Letters Patent.  Patented May 16, 1916.

Application filed March 16, 1914. Serial No. 824,878.

*To all whom it may concern:*

Be it known that I, VALÈRE ALFRED FYNN, a subject of the King of England, residing at the city of St. Louis, State of Missouri, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates particularly to a direct-current generator adapted to give a practically constant output irrespective of the speed at which it is driven.

It is known that the output of a direct-current generator can be limited by connecting the exciting winding between a main brush and an auxiliary brush located somewhere between the two main brushes, but such an arrangement merely limits the output of the generator and does not keep the latter anywhere near constant, the current rising very rapidly at first, reaching a maximum as the speed is increased, and then quickly diminishing with a further increase in speed.

It is the object of my invention to provide a generator in which the output will remain practically constant for all speeds, and in which the shape of the output curve can be readily adjusted to suit the particular conditions. I achieve this object by using two exciting windings, connecting the one between a main brush and an auxiliary brush on one side thereof, and the other between the same main brush and another auxiliary brush located on the other side of the said main brush. I prefer to give to the one winding more turns and a higher resistance than to the other, and to secure the desired output curve shape by adjusting the position of one exciting brush, or of both.

The accompanying drawing diagrammatically represents a two-pole machine embodying my invention. Referring to the drawing, 2 represents a commuted winding on the armature, with which coöperate main brushes 3, 4, preferably located in the neutral zone, and two auxiliary brushes 5, 6, located under poles of opposite polarity and somewhere between the main brushes. These brushes are, as is now usual, shown as resting on the commuted winding itself. This conventional showing makes all reference to connections between the commuted winding and the commutator unnecessary, for reference to brush position locates the armature conductors which are first reached from each brush.

7 is a low resistance shunt exciting winding of a few turns connected between the main brush 4 and the auxiliary brush 5, and 8 is a high resistance shunt exciting winding of many turns connected between the main brush 4 and the auxiliary brush 6. The dynamo is adapted to coöperate with the storage battery 14 so as to charge same, and may also be used to help said storage battery to supply the translating devices 15, 16, included in consumption circuits controlled by the switches 17 and 18.

An automatic battery switch of known construction is interposed between one pole of the storage battery and the main brush 3. This automatic switch comprises a movable member pivoted at 12 carrying at one end a contact 21 adapted to coöperate with the stationary contact 13 and at the other an armature 11 adapted to coöperate with the magnet 22. The spring 23 normally holds the contacts 21 and 13 apart. The magnet 22 carries a shunt winding 10 connected across the main brushes 3, 4, and a series winding 9 included between the contact 21 and the main brush 3.

The mode of operation is somewhat as follows: As soon as the dynamo has "picked up" any increase in speed will very rapidly increase both exciting voltages and also the voltage at the main brushes, thus increasing the magnetizing effect of coil 10 of the automatic switch. When the dynamo voltage reaches a value approximately equal to the mean terminal voltage of the storage battery 14, then the armature 11 of the automatic switch will be attracted and the circuit between the dynamo and the storage battery will be closed at the points 13 and 21. Any further increase in speed will cause the dynamo to send a charging current into the storage battery, which charging current will increase the magnetization of the automatic switch, because it circulates through the coil 9 thereof, so as to produce a magnetization of same direction as that due to the coil 10. The terminal voltage will vary somewhat with the condition of charge of the storage battery, as is now well understood, rising a little with increasing battery charge, but the voltage between the main brush 4 and the auxiliary brush 5, also that between the main brush 4 and the auxiliary brush 6, will vary considerably with the speed and the load. The proportions are so chosen that the excitation due to the winding 7 is, at first, considerably greater than that due to 8. For the direction of rotation and the direction of the magnetic flux produced by the field windings indicated in the figure, the voltage between the brushes 4 and 5 will diminish and that between 4 and 6 will increase with increasing speed or with increasing load. Under these circumstances, the proportion of the total magnetization supplied by the winding 7 will be great at low speeds and small at the higher speeds, while the reverse will be true of the magnetization due to the winding 8, with the result that the current output of the generator, which, for a given speed and given external conditions, depends on the total magnetization of the machine, will not droop as fast with increasing speed as it would do if the shunt winding 7 were alone present. By moving the auxiliary brush 5 with relation to the main brush 4, I can adjust the regulation due to the drooping excitation produced by the field winding 7, and, by adjusting the auxiliary brush 6 with respect to the main brush 4, I can independently adjust the rising excitation due to the exciting winding 8. The fact that I am able to adjust these two magnetizations independently of each other, not only enables me to secure a practically constant current output irrespective of speed, but also makes it possible to vary the output curve within very wide limits and to adjust it in almost any desired manner much more readily and accurately than would otherwise be possible.

The translating devices 15, 16, may be operated either from the battery or from the battery and the dynamo.

Having fully described my invention, what I claim as new and desire to secure by Letters-Patent of the United States is:

1. In a dynamo electric machine, the combination with an armature provided with a commuted winding and main and auxiliary brushes, of two field windings each displaced from the main brushes, one of said field windings being connected to a main brush and to an auxiliary brush, and the second field winding being connected to the same main brush as the first and to another auxiliary brush, at least one of said auxiliary brushes being located within the influence of the field magnetization.

2. In a dynamo electric machine, the combination with an armature provided with a commuted winding and main and auxiliary brushes, of two field windings each displaced ninety electrical degrees with relation to the main brushes, one of said field windings being connected to a main brush and to an auxiliary brush, and the second field winding being connected to the same main brush as the first and to another auxiliary brush.

3. In a dynamo electric machine, an armature having a commuted winding, main and auxiliary brushes coöperating therewith, a field winding connected to a main and to an auxiliary brush, and a second field winding of higher resistance and more turns than the first connected to the same main brush and to another auxiliary brush, said auxiliary brushes being located within the influence of the field magnetization.

4. In a dynamo electric machine, the combination with two co-axial field windings, of an armature provided with two main brushes and two auxiliary brushes, said auxiliary brushes being located under opposite poles, one of the field windings being connected to a main brush and to an auxiliary brush, and the other field winding being connected to the same main brush as the first and to the other auxiliary brush.

In testimony whereof, I have hereunto set my hand and affixed my seal in the presence of the two subscribing witnesses.

VALÈRE A. FYNN. [L. S.]

Witnesses:
 W. A. ALEXANDER,
 G. M. SHORE.